US007627473B2

(12) United States Patent
Gunawardana et al.

(10) Patent No.: US 7,627,473 B2
(45) Date of Patent: Dec. 1, 2009

(54) HIDDEN CONDITIONAL RANDOM FIELD MODELS FOR PHONETIC CLASSIFICATION AND SPEECH RECOGNITION

(75) Inventors: Asela J. Gunawardana, Seattle, WA (US); Milind Mahajan, Redmond, WA (US); Alejandro Acero, Bellevue, WA (US)

(73) Assignee: Microsoft Corporation, Redmons, WA (US)

( * ) Notice: Subject to any disclaimer, the term of this patent is extended or adjusted under 35 U.S.C. 154(b) by 986 days.

(21) Appl. No.: 10/966,047

(22) Filed: Oct. 15, 2004

(65) Prior Publication Data

US 2006/0085190 A1    Apr. 20, 2006

(51) Int. Cl.
G10L 17/00 (2006.01)
G10L 15/14 (2006.01)
(52) U.S. Cl. .................... 704/250; 704/256; 704/256.1; 704/256.2
(58) Field of Classification Search ................. 704/256, 704/256.1, 256.2, 250
See application file for complete search history.

(56) References Cited

U.S. PATENT DOCUMENTS

2003/0097266 A1*    5/2003    Acero ........................ 704/260

OTHER PUBLICATIONS

Young, "Acoustic modelling for large vocabulary continuous speech recognition," Proc. NATO Advanced Study Institute, Edited by Keith Ponting, Published by Springer-Verlag, 1999.*
Goodman, "Reduction of maximum entropy models to Hidden Markov Models,", UAI 2002.*
Rabiner, "A tutorial on Hidden Markov Models and Selected Applications in Speech Recognition", Proc. of the IEEE, vol. 77, Feb. 1989.*
J. Lafferty et al., "Conditional Random Fields: Probabilistic Models for Segmenting and Labeling Sequence Data," in ICML, pp. 282-289, 2001.
A. McCallum, "Efficiently Inducing Features of Conditional Random Fields," Inc UAI, 2003.
F. Sha et al., "Shallow Parsing with Conditional Random Fields," in Proc. HLT- NAACL, 2003.
P.S. Gopalakrishnan, Dimitri Kanevsky, Arthur Nadas, and David Nahamoo, An Inequality for Rational Functions with Applications to Some Statistical Estimation Problems, IEEE Trans. Inf. Thry., 37(1):107-113, Jan. 1991.
Biing-Hwang Juang and Shigeru Katagiri, "Discriminative Learning for Minimum Error Classification," IEEE Trans. Sig. Proc., 40(12):3043-3054, Dec. 1992.
J.N. Darroch and D. Ratcliff, Generalized Iterative Scaling for Log-Linear Models,: Ann. Math. Stat., 43(5):1470-1480, 1972.

(Continued)

*Primary Examiner*—Richemond Dorvil
*Assistant Examiner*—Jialong He
(74) *Attorney, Agent, or Firm*—Theodore M. Magee; Westman, Champlin & Kelly, P.A.

(57) ABSTRACT

A method and apparatus are provided for training and using a hidden conditional random field model for speech recognition and phonetic classification. The hidden conditional random field model uses feature functions, at least one of which is based on a hidden state in a phonetic unit. Values for the feature functions are determined from a segment of speech, and these values are used to identify a phonetic unit for the segment of speech.

12 Claims, 6 Drawing Sheets

OTHER PUBLICATIONS

S. Wang, R. Rosenfeld, Y. Zhao, and D. Shuurmans, "The Latent Maximum Entropy Principle," in IEEE Int. Symp. Inf. Thry., 2002.

C.F. Jeff Wu, "On the Convergence Properties of the EM Algorithm," Ann. Stat., 11(1):95-103, 1983.

Ruslan Salakhutdinov et al, "Optimization with EM and Expectation-Conjugate-Gradient," in ICML, 2003.

Wolfgang Macherey et al., "A Comparative Study on Maximum Entropy and Discriminative Training for Acoustic Modeling in Automatic Speech Recognition," in Eurospeech, pp. 493-496, 2003.

Rathinavelu Chengalvarayan and Li Deng, "HMM-based Speech Recognition Using State-Dependent, Discriminatively Derived Transforms on Mel-Warped DFT Features," IEEE Trans. Spch. & Aud. Proc., 5(3):243-256, May 1997.

S. Kakade et al., "An Alternate Objective Function for Markovian Fields," In ICML, 2002.

Hong-Kwang et al., "Maximum Entropy Direct Models for Speech Recognition," in ASURA, 2003.

Stanley F. Chen et al., "A Guassian Prior for Smoothing Maximum Entropy Models," Technical Report CMU-CS-99-108, Computer Science Department, Carnegie Mellon University, 1999.

European Search Report from Appln No. 05108905.0 filed Sep. 27, 2005.

H.M. Wallach: "Conditional Random Fields: An Introduction," CIS Technical Report, Feb. 24, 2004, University of Pennsylvania, USA.

A. Gunawardana et al., "Hidden Conditional Random Fields for Phone Classification," Eurospeech 2005, Sep. 4, 2005.

* cited by examiner

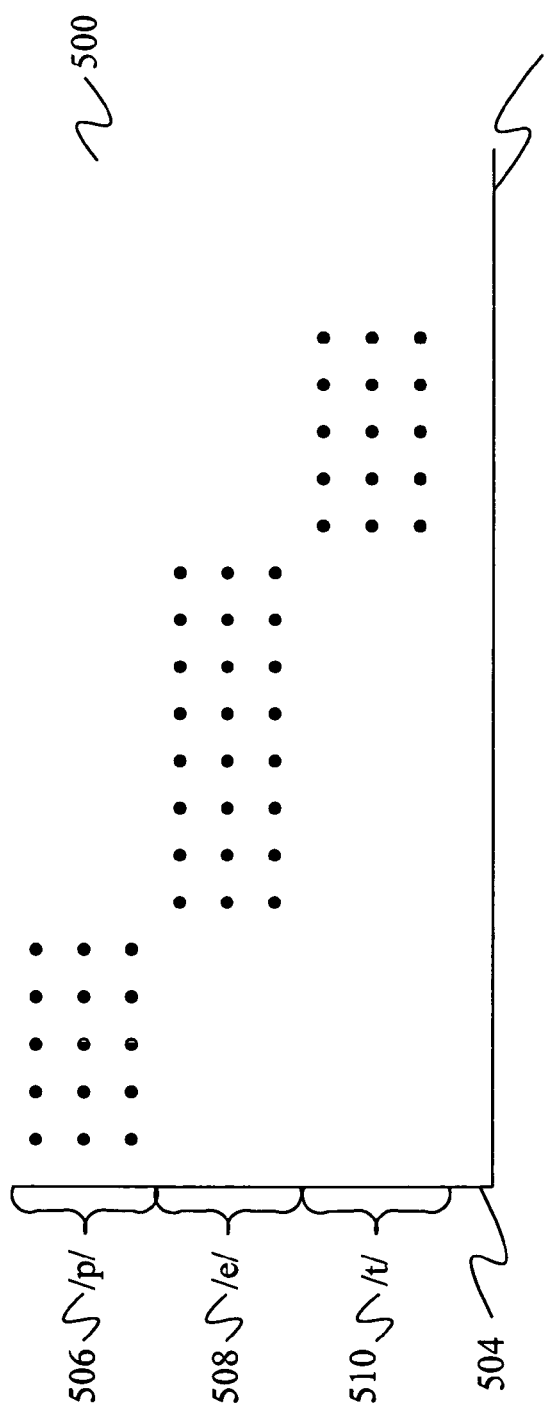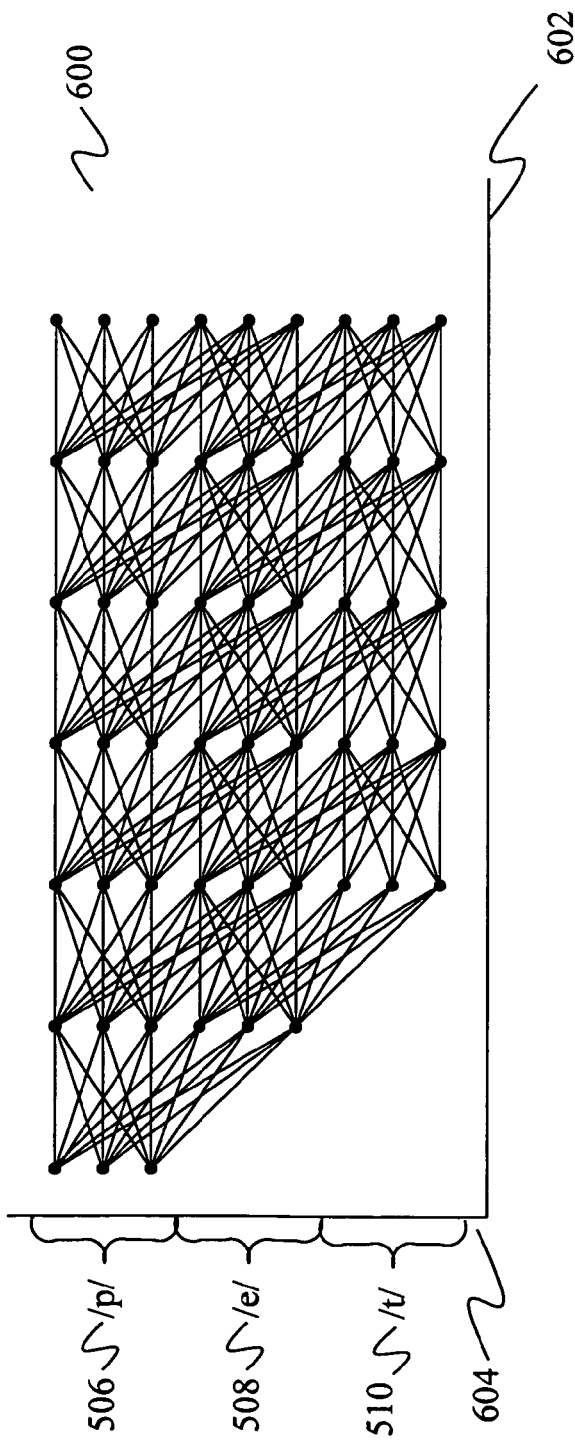

HIDDEN CONDITIONAL RANDOM FIELD MODELS FOR PHONETIC CLASSIFICATION AND SPEECH RECOGNITION

BACKGROUND OF THE INVENTION

The present invention relates to phonetic classification and speech recognition. In particular, the present invention relates to models used to perform automatic phonetic classification and speech recognition.

In phonetic classification and speech recognition, Hidden Markov Models (HMMs) have been used extensively to model the acoustics of speech. HMMs are generative models that use the concept of a hidden state sequence to model the non-stationarity of the generation of observations from a label. At each frame of an input signal, the HMM determines the probability of generating that state from each possible hidden state. This probability is determined by applying observed values derived from the frame of speech to a set of probability distributions associated with the state. In addition, the HMM determines a probability of transitioning from a previous state to each of the states in the Hidden Markov Model. Using the combined transition probability and observation probability, the Hidden Markov Model selects a state that is most likely to have generated the frame.

One limitation of Hidden Markov Models is that the probabilities of each state are determined using the same observed values, and thus the same collection of observed values are used against each state. This limitation is undesirable because different observed values are more important for certain speech sounds than for others. For example, when distinguishing vowel sounds from each other, the value of the formants are important. However, when distinguishing between fricatives, information as to whether the speech is voiced or unvoiced is informative. Thus, it would be desirable to be able to use different observed values for states associated with different speech sounds. However, HMM systems do not allow this.

In addition, HMM models do not allow a change in the length of between-frame dependencies for the observed values. Thus, at each frame, the observed values provide a fixed amount of information about previous frames. To help distinguish between speech sounds, it would be desirable to allow for different length frame dependencies for states associated with different speech sounds.

In the field of sequence labeling, conditional random field models have been used that avoid some of the limitations of Hidden Markov Models. In particular, conditional random field models allow observations taken across an entire utterance to be used at each frame when determining the probability for a label in the frame. In addition, different labels may be associated with different observed values, thereby allowing a better selection of observed values for each label.

One problem with CRF models is that they have required that the labels be known at the time of training. As such, the CRF models cannot model hidden states since the hidden states are unknown at training. As such, CRF models have not been used in speech recognition and phonetic classification.

Recently, an extension to conditional random field models has been suggested that incorporates hidden states. However, it has not been suggested or shown that this extension of the conditional random field models can be used in speech recognition or phonetic classification. In particular, the hidden states shown in the extension do not correspond to hidden states traditionally used in speech recognition, which are associated with particular phonetic units.

SUMMARY OF THE INVENTION

A method and apparatus are provided for training and using a hidden conditional random field model for speech recognition and phonetic classification. The hidden conditional random field model uses features functions, at least one of which is based on a hidden state in a phonetic unit. Values for the features functions are determined from a segment of speech, and these values are used to identify a phonetic unit for the segment of speech.

BRIEF DESCRIPTION OF THE DRAWINGS

FIG. 5 is a constrained trellis diagram used in training a hidden conditional random field model under embodiments of the present invention where the phonetic unit boundaries are known.

FIG. 6 is a constrained trellis diagram used in training a hidden conditional random field model under embodiments of the present invention where the phonetic unit boundaries are unknown.

DETAILED DESCRIPTION OF ILLUSTRATIVE EMBODIMENTS

Figure 1:
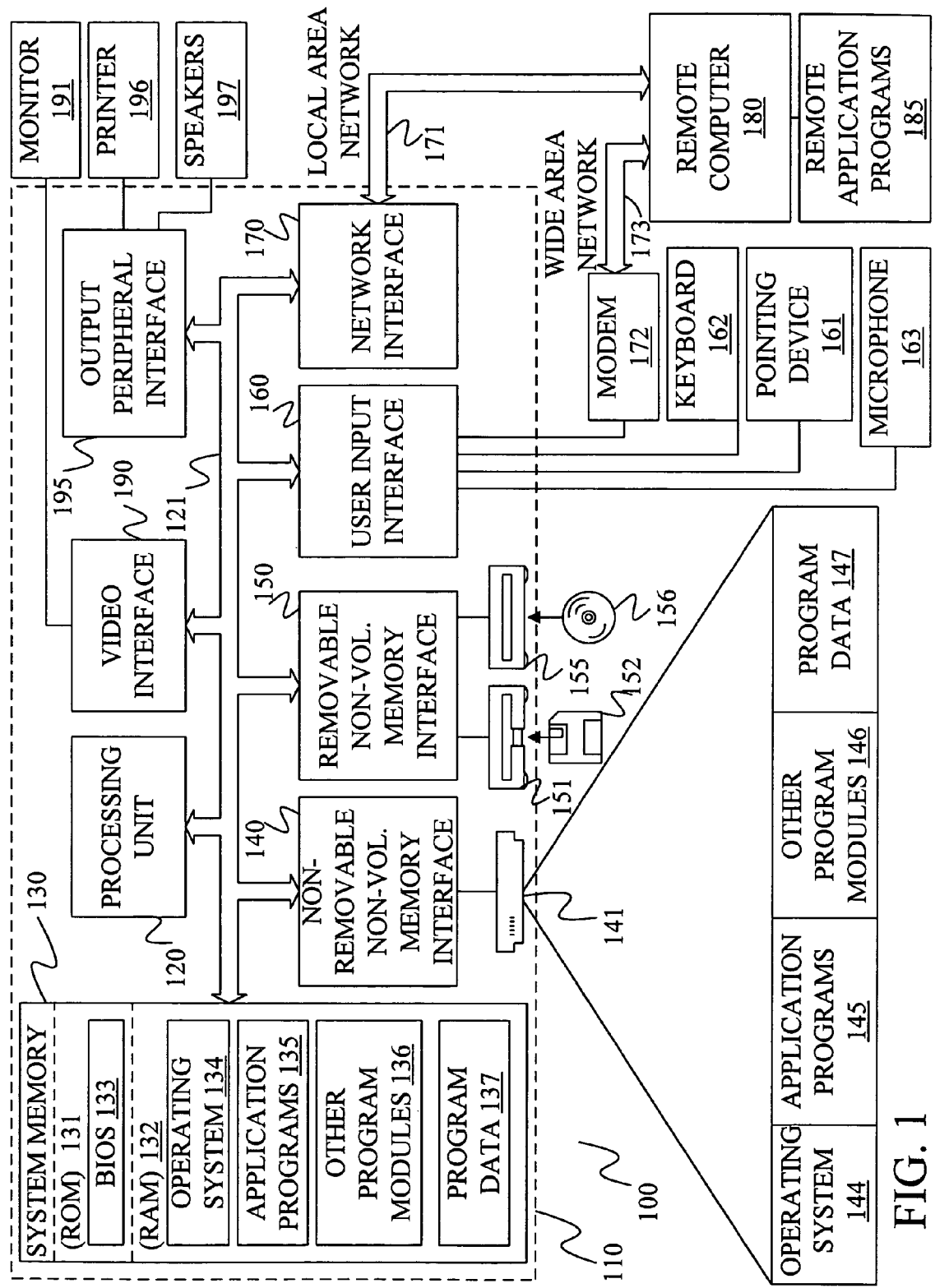
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
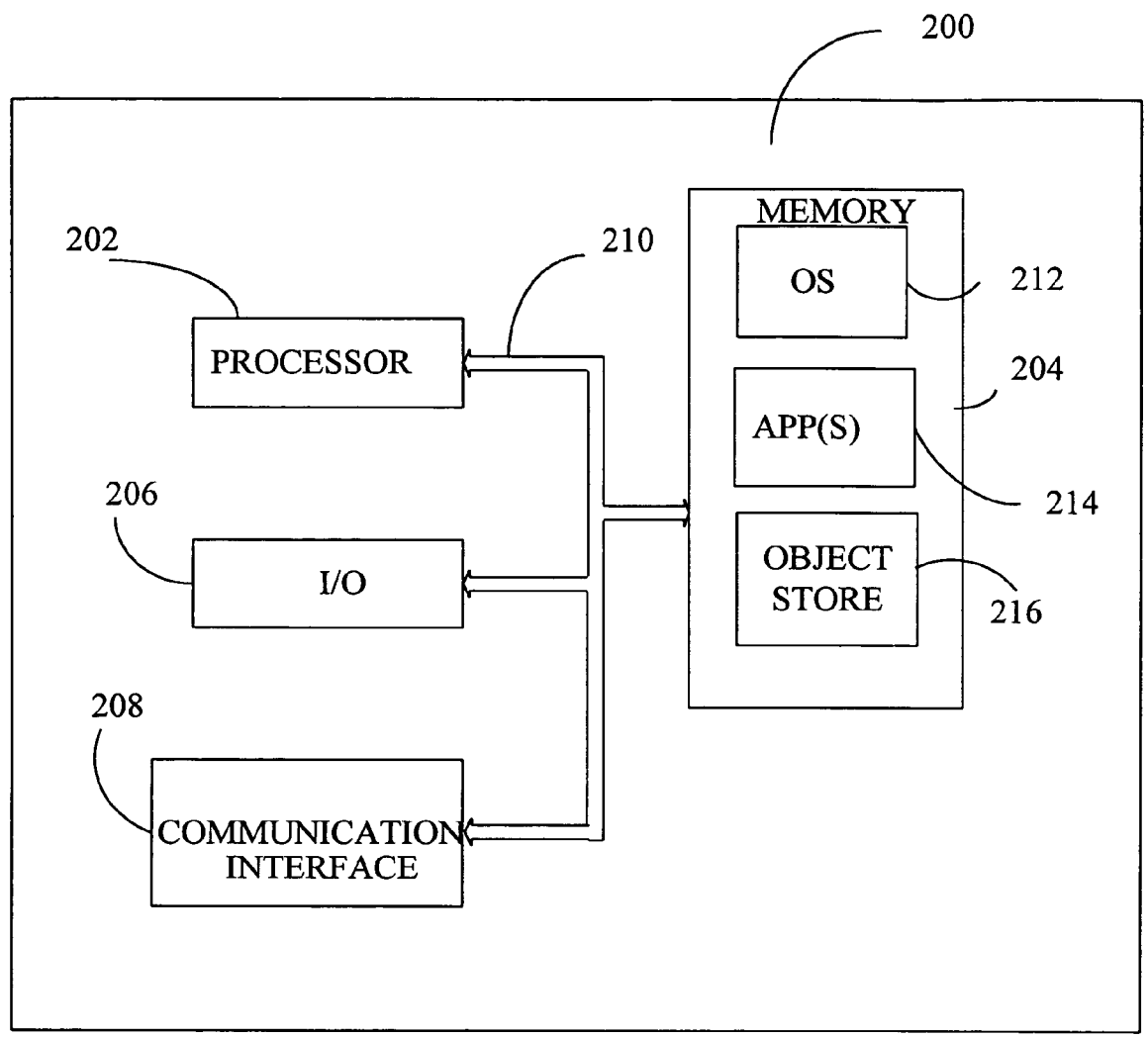
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Under the present invention, phonetic classification and speech recognition are performed using conditional random field models with hidden states, referred to as hidden conditional random field models. A hidden conditional random field model provides a probability of a label, such as the identity of a phoneme, or a label sequence, such as a word sequence, given a sequence of observations and a set of parameters. Specifically, the hidden conditional random field model defines these probabilities as:

$$p(l \mid o_1^\tau; \lambda) = \frac{1}{z(o_1^\tau; \lambda)} \sum_{s_1^\tau \mid l(s^{(1)}) = l} \exp\left(\sum_k \lambda_k \sum_{t=1}^\tau f_k(s^{(t-1)}, s^{(t)}, o_1^\tau, t)\right) \quad \text{EQ. 1}$$

$$p(l_1^n \mid o_1^\tau; \lambda) = \frac{1}{z(o_1^\tau; \lambda)} \sum_{s_1^\tau \mid l(s_1^\tau) = l_1^n} \exp\left(\sum_k \lambda_k \sum_{t=1}^\tau f_k(s^{(t-1)}, s^{(t)}, o_1^\tau, t)\right) \quad \text{EQ. 2}$$

where: $p(l \mid o_1^\tau; \lambda)$ is the probability of label l given a sequence of observed values from time t=1 to time t=τ of $o_1^\tau$ and a set of weighting values (parameters) λ; $p(l_1^n \mid o_1^\tau; \lambda)$ is the probability of a label sequence $l_1^n$ of n labels given a sequence of observed values from time t=1 to time t=τ of $o_1^\tau$ and a set of weighting values (parameters) λ; $f_k(s^{(t-1)}, s^{(t)}, o_1^\tau, t)$ is a feature function with a value derived from the value of a previous hidden state $s^{(t-1)}$, a current state $s^{(t)}$, the sequence of observed values $o_1^\tau$, and a time value t; $\lambda_k$ is a weighting value for the $k^{th}$ feature $f_k$; $s_1^\tau \mid l(s^{(1)}) = l$ indicates that the summation is performed over all hidden state sequences that are consistent with label l; $s_1^\tau \mid l(s_1^{96}) = l_1^n$ indicates that the summation is performed over all hidden state sequences that are consistent with label sequence $l_1^n$; and $$\frac{1}{z(o_1^\tau; \lambda)}$$

is a normalization value.

Using EQs. 1 and 2, the probabilities for different labels can be determined from a set of observed values and feature weights, even though the features functions themselves are dependent on hidden variables.

Figure 3:
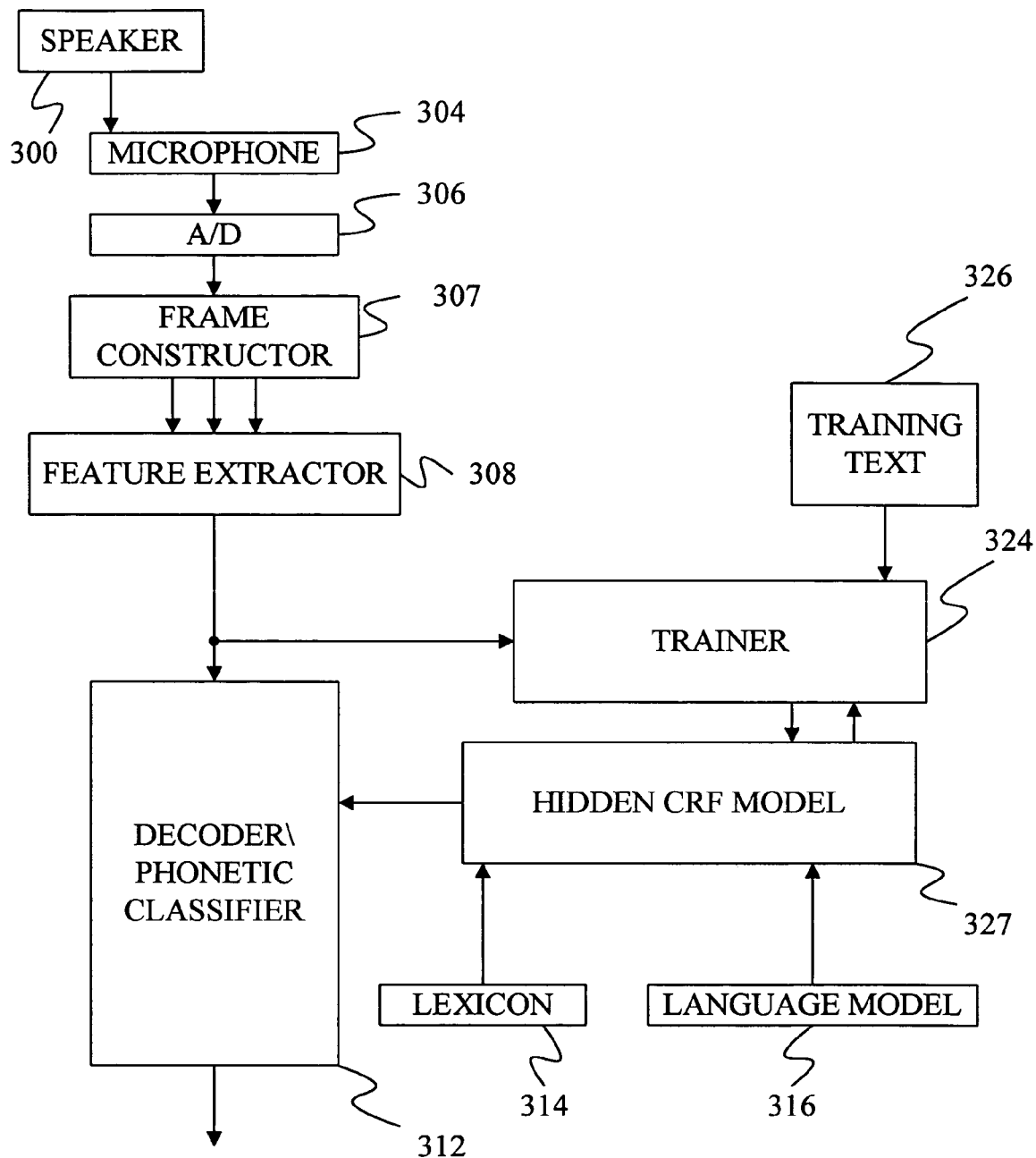
FIG. 3 is a block diagram of a speech recognition/phonetic classifier training and decoding system under one embodiment of the present invention.

FIG. 3 provides a block diagram of a system for training the parameters $\lambda_k$ of the hidden conditional random field model of the present invention and for using a hidden conditional random field model to perform phonetic classification and speech recognition.

In FIG. 3, a speaker 300 speaks into a microphone 304, which converts the audio signal into an electrical signal. The electrical signal is provided to an analog-to-digital (A/D) converter 306.

A/D converter 306 converts the analog signal from microphone 304 into a series of digital values. In one embodiment, A/D converter 306 samples the analog signal at 16 kilohertz and 16 bits per sample, thereby creating 32 kilobytes of speech data per second. These digital values are provided to a frame constructor 307, which, in one embodiment, groups the values into 25 millisecond frames that start 10 milliseconds apart. In some embodiments, frame constructor 307 is able to construct multiple frames of different sizes.

The frames of data created by frame constructor 307 are provided to feature extractor 308, which extracts observed values from each frame. Examples of feature extraction modules include modules for performing linear predictive coding, LPC derived cepstrum, perceptive linear prediction (PLP) auditory model feature extraction, and Mel-frequency cepstral coefficients (MFCC) feature extraction. In addition, feature extractor 308 can also extract observed values such as whether a frame is voiced or unvoiced, and values of formants in the frame. Note that the invention is not limited to these feature extraction modules and that other modules and other observed values may be used within the context of the present invention.

Before the hidden conditional random field model of the present invention can be used, it must be trained by a trainer 324. Trainer 324 determines the model parameters for hidden conditional random field (CRF) model 327 based on the features from feature extractor 308 and a training text 326. Specifically, trainer 324 uses a conditional maximum likelihood approach to select parameters for hidden CRF model 327 that maximize the probability of the labels found in training text 326 given the features provided by feature extractor 308 when speaker 300 pronounces the text in training text 326.

Figure 4:
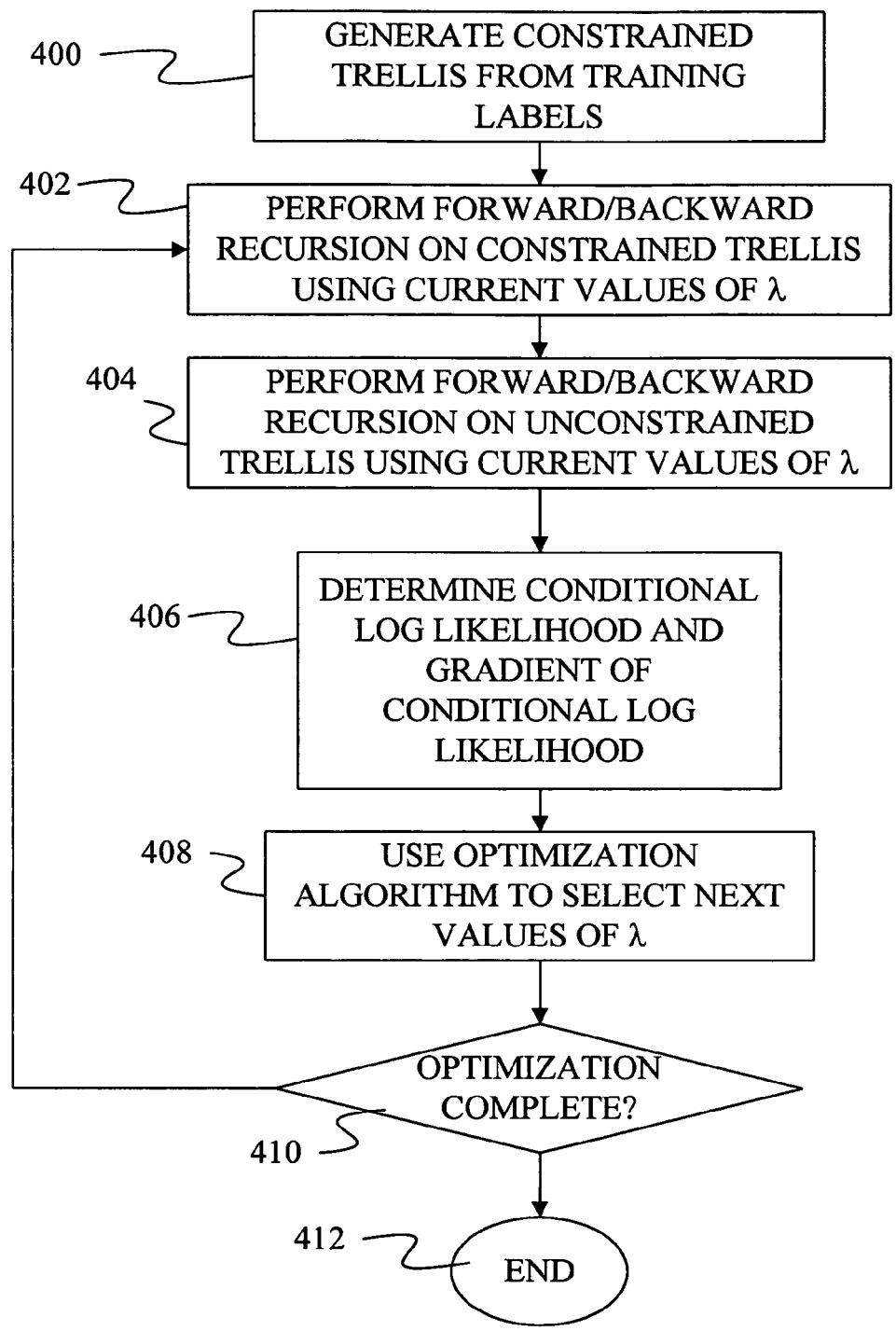
FIG. 4 is a flow diagram for training a hidden conditional random field under the present invention.

FIG. 4 provides a flow diagram of a method of training hidden CRF model 327 under one embodiment of the present invention. In step 400, trainer 324 generates a constrained trellis from the training labels in training text 326.

For sequence recognition, the constrained trellis can take the form of the trellis of FIG. 5 or FIG. 6. FIG. 5 provides an example of a constrained trellis 500 for a limited set of phonetic labels 506, 508 and 510 representing phonemes |p|, |e|, and |t|, respectively, in which the boundaries between phonemes in the training data is known. FIG. 6 provides an example of a constrained trellis 600 for the same limited set of phonetic labels, 506, 508 and 510, but without known phoneme boundaries.

In FIGS. 5 and 6, time is shown along horizontal axes 502 and 602, respectively, and hidden states are shown along vertical axes 504 and 604, respectively. Each phonetic label, such as phonetic labels 506, 508 and 510, has three possible states in both figures.

Trellis 500 is considered constrained since at each time point, only those states associated with a single phonetic label may be occupied. Thus, states from other phonetic labels are invalid at that time point. Although the trellis is constrained, there are a number of different state sequences that can be followed through the trellis based on the observed values generated from feature extractor 308. Trellis 600 is also constrained because it limits transitions between states to only those transitions that are consistent with the sequence of phonemes in the training text. For the example of FIG. 6, the transitions between states only permit the phoneme sequence /p/ /e/ /t/.

For classification, a plurality of individual constrained trellises is used, where each trellis is limited to states for a single phoneme. During training, a single phoneme is spoken at a time and the appropriate constrained trellis is selected and used in the method of FIG. 4.

Because the states of the phonetic labels are hidden, the method of FIG. 4 performs a forward backward recursion through all of the states in the constrained trellis thereby performing the summation of states associated with each label as found in EQ. 1. The forward and backward recursions are defined as:

$$\alpha(s,t) = \begin{cases} 1 & \text{for } t = 0 \\ \sum_{s'} \alpha(s', t-1) e^{\sum_k \lambda_k f_k(s', s, o_1^\tau, t)} & \text{for } 1 \leq t \leq \tau+1 \end{cases} \quad \text{EQ. 3}$$

$$\beta(s,t) = \begin{cases} 1 & \text{for } t = \tau+1 \\ \sum_{s'} e^{\sum_k \lambda_k f_k(s, s', o_1^\tau, t+1)} \beta(s', t+1) & \text{for } 0 \leq t \leq \tau \end{cases} \quad \text{EQ. 4}$$

where $\alpha(s',t-1)$ represent the forward recursion score at previous state s' at time t−1, where the possible states are limited to those found in the constrained trellis and $\beta(s',t+1)$ represents the backward recursion score at state s' at time t+1.

In Equations 3 and 4, the features $f_k(s',s,o_1^\tau,t)$ can be any desired features functions. Under one embodiment, the feature functions include: an indicator function that has a value of one when the current state matches one state value and the previous state matches another state value; an indicator function that is one when the previous state matches the current state, a set of real valued that each take on the value of a respective separate element of the observed values when the previous state matches the current state, and a set of functions that represent the square of respective separate elements of the observed values when the previous state matches the current state. Additional feature functions include real valued feature functions that take on the values of formants when the current state matches a particular state value, such as a state associated with a vowel sound, and binary feature functions that are one if the speech signal is voiced and zero if the speech signal is unvoiced when the current state matches a particular state, such as a state associated with a fricative.

After performing the forward-backward recursion on the constrained trellis at step 402, the method of FIG. 4 continues by performing a forward-backward recursion on an unconstrained trellis at step 404.

Figure 7:
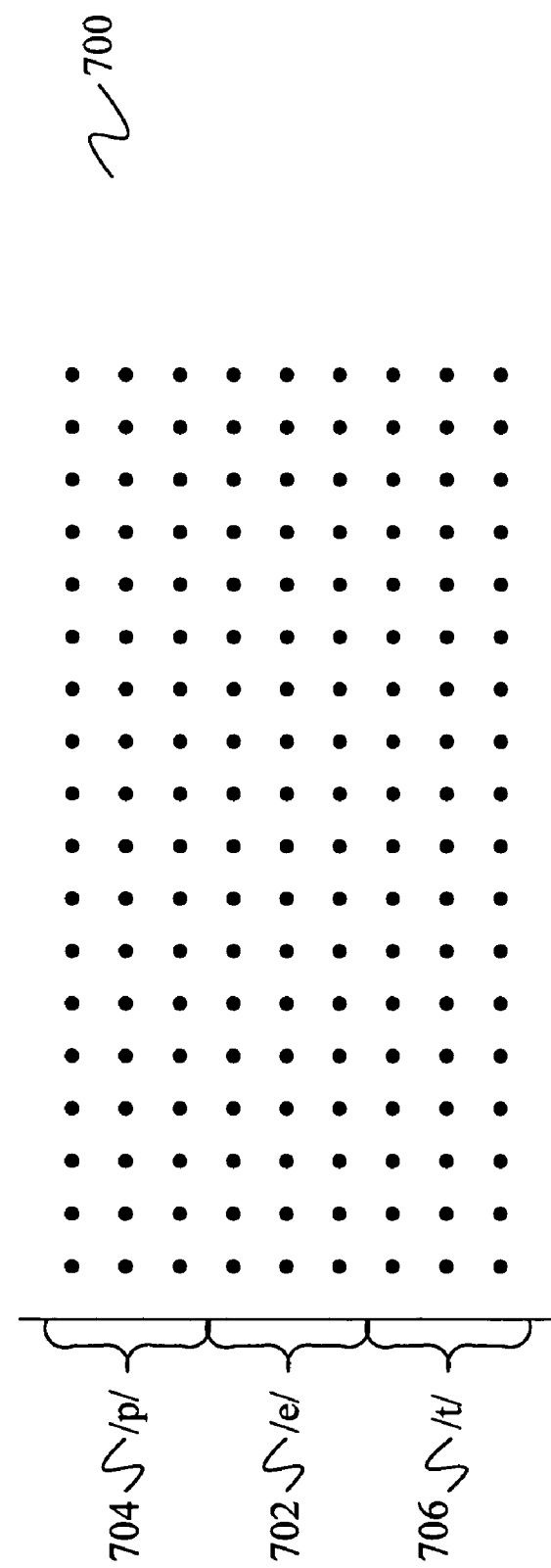
FIG. 7 is an unconstrained trellis used in training and decoding under embodiments of the present invention.

An example of an unconstrained trellis 700 is shown in FIG. 7. In FIG. 7, the unconstrained trellis is only shown for the states associated with phonetic units 702, 704, and 706. As in FIGS. 5 and 6, time is shown along the horizontal axis and the available states are shown along the vertical axis of FIG. 7. Although not shown, the unconstrained trellis contains states for each of the possible phonetic units at each time point.

The forward-backward recursion calculations are the same as those in Equations 3 and 4, except that the forward-backward recursion is applied to the unconstrained trellis instead of the constrained trellis. Under many embodiments, during the forward-backward recursion of step 404, a beam search is used in which states that have low scores during the forward recursion and the backward recursion are pruned from further consideration. This reduces the number of computations that must be performed at each time point.

At step 406, the forward-backward recursions applied to the constrained and unconstrained trellises are used to determine a conditional log likelihood and a gradient of the conditional log likelihood. Under one embodiment, the conditional log likelihood is determined as:

$$L(\lambda) = \log(p(l_1^n \mid o_1^\tau)) = \log\left[\frac{\alpha(s_F, \tau+1)}{\alpha'(s_F, \tau+1)}\right] \quad \text{EQ. 5}$$

where $\alpha(s_F,\tau+1)$ is the forward recursion score at the final single state $s_F$ at time $\tau+1$ using the constrained trellis and $\alpha'(s_F,\tau+1)$ is the forward recursion score at final state $s_F$ at time $\tau+1$ determined through the unconstrained trellis.

The gradient of the conditional log likelihood is determined as:

$$\nabla L(\lambda) = E\big[f_k(l_1^n, s_1^\tau, o_1^\tau) \mid \hat{l}_1^n, \hat{o}_1^t\big] - E[f_k(l_1^n, s_1^\tau, o_1^\tau) \mid \hat{o}_1^t] \text{ where} \quad \text{EQ. 6}$$

$$E\big[f_k(l_1^n, s_1^\tau, o_1^\tau) \mid \hat{l}_1^n, \hat{o}_1^t\big] = \sum_{z=1}^{\tau} p(s_{z-1} = s_k', s_z = s_k \mid \hat{l}_1^n, \hat{o}_1^\tau) g_k(\hat{o}_1^\tau, z) \quad \text{EQ. 7}$$

$$E[f_k(l_1^n, s_1^\tau, o_1^\tau) \mid, \hat{o}_1^t] = \sum_{z=1}^{\tau} p(s_{z-1} = s_k', s_z = s_k \mid \hat{o}_1^\tau) g_k(\hat{o}_1^\tau, z) \quad \text{EQ. 8}$$

where $$p(s_{z-1} = s_k', s_z = s_k \mid \hat{l}_1^n, \hat{o}_1^\tau) = \quad \text{EQ. 9}$$

$$\frac{1}{z(\hat{l}_1^n, \hat{o}_1^\tau)} \alpha(s', t-1) \exp\left(\sum_k \lambda_k f_k(s', s, o_1^\tau, t) \beta(s, t)\right)$$

$$p(s_{z-1} = s_k', s_z = s_k \mid \hat{o}_1^\tau) = \quad \text{EQ. 10}$$

$$\frac{1}{z(\hat{o}_1^\tau)} \alpha'(s', t-1) \exp\left(\sum_k \lambda_k f_k(s', s, o_1^\tau, t) \beta'(s, t)\right)$$

-continued $$z(\tilde{l}_1^n, \hat{o}_1^\tau) = \alpha(s_F, \tau + 1) = \beta(s_0, 0) \qquad \text{EQ. 11}$$

$$z(\hat{o}_1^\tau) = \alpha'(s_F, \tau + 1) = \beta'(s_0, 0) \qquad \text{EQ. 12}$$

and where $g_k(\hat{o}_1^l, z)$ represents the features derived from the individual elements of the observed values either raised to a single power or squared, or a function of value one. Equations 5-12 provide the log likelihood and the gradient for a single utterance example. A more complete log likelihood and gradient is formed by summing the individual log likelihood and gradient values from multiple training examples.

Once the conditional log likelihood and the gradient of the conditional log likelihood have been determined at step 406, they are used in an optimization algorithm to select new values of $\lambda_k$ for each feature function $f_k$ at step 408. Under one embodiment, the limited memory-BFGS optimization algorithm is used to select the next values of $\lambda_k$ at step 408. At step 410, the method determines if the optimization is complete. If it is not complete, the method returns to step 402 and repeats steps 402, 404 and 406 using the new values of $\lambda_k$. When the optimization is complete at step 410, the process ends at step 412.

Once the model parameters for hidden CRF model 327 have been trained by trainer 324 using the process of FIG. 4, phonetic classification and speech recognition may be performed by decoder/phonetic classifier 312.

During speech recognition, speaker 300 pronounces a sequence of words. This audio signal is processed by microphone 304, A/D converter 306, frame constructor 307 and feature extractor 308 in the same manner as the training signal to produce a set of observed values. These observed values are provided to decoder 312. In the case of phonetic classification, the sequence of observed values is limited to those sequences associated with frames for a single phoneme. For speech recognition, the sequence of observed values are for the frames across the entire utterance.

To perform phonetic classification, a separate constrained trellis is formed for each phonetic unit. A forward recursion is performed in each trellis to determine the numerator of the conditional log likelihood of equation 5. The phonetic unit associated with the trellis that provides the greatest value for the numerator is then selected as the phonetic unit for the utterance.

The same technique can be used in speech recognition when there are limited sets of possible phonetic sequences that are to be recognized. In such cases, a constrained trellis, such as the trellis of FIG. 6 can be constructed for each possible phonetic sequence. A forward recursion is then performed in each trellis to determine the numerator of the conditional log likelihood of equation 5. The sequence of phonetic units associated with the trellis that provides the greatest value is then selected as the sequence of phonetic units for the utterance.

To perform speech recognition, an unconstrained trellis, similar to the trellis in FIG. 7 is constructed. A forward recursion is then performed using the following equation:

$$\alpha(s,t) = \begin{cases} 1 & \text{for } t = 0 \\ \max_{(s',t-1)} \left[ \alpha(s', t-1) e^{\sum_k \lambda_k f_k(s', s, o_1^t, t)} \right] & \text{for } 1 \leq t \leq \tau + 1 \end{cases} \qquad \text{EQ. 13}$$

where EQ. 13 is similar to EQ. 3 except the forward recursion is performed across an unconstrained trellis and instead of taking a summation over previous states s', the previous state s' that maximizes the value of $\alpha(s,t)$ is selected and used to compute the value of $\alpha(s,t)$. After this forward pass is complete, a single path through the unconstrained trellis has been identified by selecting the states that provide the maximum score at each time point. By retracing this path, the sequence of states associates with the input speech signal can be identified. Under embodiments of the present invention, each state is only assigned to a single label. As such, the sequence of states can be easily transformed into a sequence of labels thereby providing the recognized output or phonetic classification.

In some embodiments, pruning is performed during the forward recursion by eliminating states at each time frame that have low values for $\alpha(s,t)$.

In some speech recognition embodiments, the trellis for decoding is constrained to allowed sequences of phonetic units found in a lexicon 314, which contains the pronunciations for words in the language. In further embodiments, multiple possible sequences of phonetic units are identified using the hidden conditional random field model. The scores determined for each sequence by the hidden conditional random field model are combined with language model scores for the sequences of words represented by the sequences of phonetic units. Such language model scores are generated by a language model 316. The sequence of phonetic units that provides the highest combined score is selected as the sequence of phonetic units for the speech segment by decoder 312.

In other speech recognition embodiments, the language model and the lexicon are integrated with the hidden conditional random field model. Under such embodiments, the language model is implemented using features that ignore the acoustics and instead look at transitions between different words. Similarly, the lexicon is implemented by transition features that only allow state sequences that correspond to valid pronunciations. The parameters for the language model features and the lexicon features may be retrained during the hidden conditional random field model training or may set using a separate training process.

Note that if the language model is available during training of the hidden conditional random field model, the weights of the hidden conditional random field model will be trained to discriminate only between word sequences that the language model sees as being equally likely. By training in this manner, modeling power in the acoustic model is not wasted on modeling differences that the language model will resolve.

Although the present invention has been described with reference to particular embodiments, workers skilled in the art will recognize that changes may be made in form and detail without departing from the spirit and scope of the invention.

What is claimed is:

1. A computer-readable storage medium having computer-executable instructions stored thereon that when executed by a processor cause the processor to perform steps comprising:
   receiving a speech signal;
   determining a sequence of observed values from the speech signal;
   forming a separate constrained trellis for each of a plurality of phonetic units, each constrained trellis comprising hidden states at a plurality of time points;
   computing a recursive score for each constrained trellis, each recursive score based on an exponential function with e raised to a sum of weighted feature function values, wherein at least one of the feature function values is set equal to a value of a formant in the speech signal based on a determination that a current hidden state matches a particular hidden state;

comparing the recursive scores for the constrained trellises to each other to identify the constrained trellis that provides the greatest score; and identifying the phonetic unit associated with the constrained trellis that provides the greatest score as the phonetic unit represented by the speech signal.

2. The computer-readable storage medium of claim 1 wherein at least one feature function value is set equal to one element of an observed value based on a determination that a current hidden state matches a particular hidden state.

3. The computer-readable storage medium of claim 1 wherein at least one feature function value is set equal to the square of one element of an observed value based on a determination that a current hidden state matches a particular hidden state.

4. The computer-readable storage medium of claim 1 wherein at least one feature function value is set equal to one if the speech signal is voiced and zero if the speech signal is unvoiced based on a determination that a current hidden state matches a particular hidden state.

5. The computer-readable storage medium of claim 4 wherein at least one feature function value is set equal to zero based on a determination that a current hidden state does not match a particular hidden state.

6. The computer-readable storage medium of claim 1 wherein weights for the weighted feature function values are trained using a constrained trellis of hidden states comprising a separate set of hidden states at each of a plurality of time points, each set comprising fewer than all possible hidden states.

7. The computer-readable storage medium of claim 6 wherein the weights are trained using an unconstrained trellis.

8. The computer-readable storage medium of claim 1 wherein the weights for the weighted feature function values are trained by determining a conditional log likelihood and a gradient of the conditional log likelihood.

9. A method of decoding a speech signal to identify at least one phonetic unit, the method comprising:

converting the speech signal into a sequence of observed values;

forming a constrained trellis for each of a set of phonetic units, each constrained trellis comprising a lattice of hidden states extending across time points from an initial time point to a final time point;

for each phonetic unit:
setting an initial forward recursion score to one for each hidden state at the initial time point;
a processor producing a forward recursion score for a final hidden state at the final time point by recursively computing a forward recursion score for each hidden state for each time point after the initial time point, each forward recursion score formed by determining a sum of summands taken over all states at a previous time point, each summand in the sum being a product of a forward recursion score at a hidden state at the previous time point and an exponential function with e raised to a function, where the function is a sum of weighted feature function values, where a feature function value for a squared element feature function at a first state at a time point comprises the square of an element of an observed value for the time point;

comparing the forward recursion scores for the final hidden states at the final time points of each phonetic unit to identify the phonetic unit with the greatest forward recursion score; and selecting the phonetic unit with the greatest forward recursion score as the phonetic unit represented by the speech signal.

10. The method of claim 9 wherein a feature function value for a formant feature function at a first state at a time point comprises a formant value for the speech signal.

11. The method of claim 9 wherein a feature function value for an element feature function at a first state at a time point comprises an element of an observed value generated from the segment of speech.

12. The method of claim 9 wherein a feature function value for a binary feature function at a first state at a time point comprises a value of one and a feature function value for the binary feature function at a second state at the time point comprises a value of zero.

* * * * *